United States Patent Office 2,709,180
Patented May 24, 1955

2,709,180

ARYLATED COMPOSITION OF MATTER

Arthur Goldman, Chicago, Ill., assignor to Arvey Corporation, a corporation of Illinois No Drawing. Application October 30, 1952,
Serial No. 317,845

3 Claims. (Cl. 260—650)

This invention relates to the production of a new group of compositions of matter having unexpected insecticidal activity, which activity is imparted by the presence of an aryl group. More specifically, this invention relates to the production of 1-aryl-4,5,6,7,8,8-hexachloro-3a,4,7,7a-tetrahydro-4,7-methanoindene.

The compounds of the present invention are derivatives of 4,5,6,7,8,8-hexachloro-3a,4,7,7a-tetrahydro-4,7-methanoindene. The 1-aryl derivatives of said indene may be prepared by reacting a 1-halo derivative of said indene with an aryl compound having at least one unsubstituted nuclear hydrogen atom in the presence of a catalyst in liquid phase.

The aryl derivatives of the present invention are unusual in that they exhibit a markedly greater activity toward insects than does the parent structure. This is an unexpected phenomenon, since the substitution of a hydrocarbon grouping into a halogenated insecticidal compound commonly has no effect or more usually results in lower activity than that exhibited by the halogenated parent compound. In the present case, while the parent has substantial insecticidal activity, namely, equivalent to that of DDT, the 1-aryl derivatives thereof unexpectedly exhibit an activity many times exceeding that of the parent compound.

Further, the process by which the 1-aryl indenes are prepared is unusual in that it is specific in the production of the desired product and minimizes or eliminates any side products. The catalytic arylation of a polyhalogenated hydrocarbon ordinarily results in the production of a multiplicity of products which vary both with respect to position and quantity of aryl groups introduced. Such is not the case with respect to the present process. The aryl group is introduced into the specific number one position of said parent indene; only one such aryl grouping is introduced thereby, and the yield of active compound is very excellent.

4,5,6,7,8,8 - hexachloro - 3a,4,7,7a - tetrahydro - 4,7 - methanoindene may be prepared in accordance with the process disclosed and claimed by Herzfeld et al. United States Patent No. 2,606,910, issued August 12, 1952. The 1-bromo derivative thereof, which is useful in the present process, can be prepared by reacting said parent indene with bromine in the presence of peroxides and in a solvent such as carbon tetrachloride. Also useful is the 1-chloro derivative which may be prepared by chlorinating said parent indene with chlorine in the presence of fuller's earth as a catalyst.

The present process comprises arylating 4,5,6,7,8,8-hexachloro-3a,4,7,7a-tetrahydro-4,7-methanoindene in the one position by reacting the 1-halo derivative thereof in the presence of a catalyst and in the liquid phase with an aryl compound.

The aryl compound may be mono- or di-cyclic, such as benzene, toluene, xylene, naphthalene, mono-methyl naphthalene, dimethyl naphthalene, ethyl benzene, propyl benzene, ethyl naphthalene, biphenyl, or the like.

Solvent for the reaction may be an excess of the aryl compound, or where such aryl compound is a solid at the desired reaction temperature, additional nonreactive solvent of an aliphatic nature such as hexane, heptane, octane, or the like may be used. It is generally preferred to use an excess of aryl compound as solvent where such is liquid under the condition used. However, additional aliphatic solvent may also be used in such cases.

The catalyst utilized in the present process is generally termed a Friedel-Crafts type catalyst and is exemplified by $FeCl_3$, $AlCl_3$, $AlF_3$, $BF_3$, $HF$, $HgCl_2$, $HgF_2$, $CaF_2$, $ZnCl_2$, $ZnF_2$, etc. Other catalysts of the class Friedel-Crafts type catalyst are known and can be used in the present process.

The process proceeds more rapidly at elevated temperatures. It is most convenient to utilize the reflux temperature of the solvent used as the operating temperature. Temperatures between about 50° C. to about 150° C. may be used, and temperatures between about 70° C. and about 125° C. are preferred. Operating under reflux conditions allows for the maintenance of a uniform temperature and is as well a convenient means for dissipating any heat of reaction.

The reaction time required is not critical. While the time required for complete reaction will vary with temperature, from about one to about twenty hours is sufficient.

To more clearly illustrate the present process, Example I which specifically shows the production of 1-phenyl-4,5,6,7,8,8 - hexachloro - 3a,4,7,7a - tetrahydro - 4,7 - methanoindene is herewith presented.

*Example I*

To a stirred solution of 1-bromo-4,5,6,7,8,8-hexachloro-3a,4,7,7a-tetrahydro-4,7-methanoindene (42 g.; 0.1 mole) in dry benzene (200 ml.) was added anhydrous $HgF_2$ (16.7 g.; 0.07 moles) and the mixture was heated under reflux for five hours. The insoluble salt was then removed from the reaction mixture by filtration. The benzene filtrate was washed with $H_2O$, dried, and then evaporated. The residue was first triturated with pentane and then dissolved in pentane and filtered. The pentane filtrate was concentrated by evaporation and then chilled. A crystalline precipitate formed which was isolated by filtration. This product, which was the desired 1-phenyl product, was recrystallized from pentane and had a melting point of 77°–78.5° C.

| | Calculated for $C_{16}H_{10}Cl_6$ | Found for Product |
|---|---|---|
| C | 46.32 | 46.30 |
| H | 2.43 | 2.40 |
| Cl | 51.27 | 51.26 |

Example II indicates a method for preparing the 1-naphthyl derivative.

*Example II*

To a stirred solution of 1-bromo-4,5,6,7,8,8-hexachloro-3a-4,7,7a-tetrahydro-4,7-methanoindene (42 g.; 0.1 mole) dissolved in dry hexane (200 ml.) are added naphthalene (100 g.) and $FeCl_3$ (4 g.) and the mixture is heated under reflux for ten hours. The catalyst and solvent are removed as indicated in Example I and the product can be purified by crystallization from pentane.

The products of the present invention are potent insecticides, useful against a wide variety of insect pests both in the household and in agriculture. Exemplifying such toxicity is the following data with respect to the product of Example I:

Toxicants were dissolved in acetone solution in the designated concentrations. Filter paper dipped in the solution and dried was placed in the cages of the insects for seventy-two hours. There were twenty insects used in each replicate of the experiment and the mortalities are recorded at twenty-four-hour intervals.

[Toxicant: 1-phenyl-4,5,6,7,8,8-hexachloro-3a,4,7,7a-tetrahydro-4,7-methanoindene.]

| Insect | Concentration, Percent | Percent Mortality After— | | |
|---|---|---|---|---|
| | | 24 hrs. | 48 hrs. | 72 hrs. |
| Granary Weevils | 2 | 100 | 100 | 100 |
| | | 100 | 100 | 100 |
| Milkweed Bugs | 2 | 95 | 100 | 100 |
| | | 100 | 100 | 100 |
| Tribolium | 2 | 100 | 100 | 100 |
| | | 100 | 100 | 100 |

The 1-aryl derivatives of the present invention are not only valuable materials in view of their insecticidal properties, but are also of great value as intermediates in the preparation of other insecticides.

The value of ascertaining a variety of potent insecticides becomes increasingly more important in view of the extensive reports relating to the building up of immunity or resistance of insects to known insecticides after multiple treatment.

The successful introduction of an aryl group into a known insecticidal composition, accompanied by a significant enhancement of the toxicity of such derivative rather than a normal diminution thereof, makes available a wide variety of valuable derivatives in view of the normal reactivity of such aryl groupings.

The compounds of the present invention may be utilized and applied as a sole active ingredient dispersed in carriers such as dusts, solvents, aqueous dispersions or other carriers frequently used in the art. In addition, the compounds of the present invention can be used in combination with other insecticides or fungicides.

I claim as my invention:

1. As a new composition of matter 1-aryl-4,5,6,7,8,8-hexachloro-3a,4,7,7a-tetrahydro-4,7-methanoindene, said aryl grouping being a hydrocarbon grouping containing less than three rings and not more than two alkyl groups.

2. As a new composition of matter 1-aryl-4,5,6,7,8,8-hexachloro-3a,4,7,7a-tetrahydro-4,7-methanoindene, said aryl grouping being a monocyclic hydrocarbon grouping containing not more than two alkyl groups.

3. As a new composition of matter 1-phenyl-4,5,6,7,8,8 - hexachloro - 3a,4,7,7a - tetrahydro - 4,7 - methanoindene.

No references cited.